Feb. 8, 1944.  J. W. ORENDORFF  2,341,190
TRACTOR-MOUNTED PLANTER
Filed Nov. 8, 1941  3 Sheets-Sheet 1

Inventor:
John W. Orendorff.
By Paul Q. Pippel.
Atty

Feb. 8, 1944.  J. W. ORENDORFF  2,341,190
TRACTOR-MOUNTED PLANTER
Filed Nov. 8, 1941  3 Sheets-Sheet 3

Inventor:
John W. Orendorff.
By Paul A. Pippel
Atty.

Patented Feb. 8, 1944

2,341,190

UNITED STATES PATENT OFFICE 2,341,190

TRACTOR-MOUNTED PLANTER

John W. Orendorff, Canton, Ill., assignor to International Harvester Company, a corporation of New Jersey Application November 8, 1941, Serial No. 418,379

5 Claims. (Cl. 111—59)

This invention relates to tractor-mounted implements and, more particularly, to tractor-mounted planters.

With tractor planters it has been desirable to locate the planting tools of the planter attachment close to the rear axle of the tractor and, as well, to distribute fertilizer during the planting operation from a location close and adjacent to the planter frame. The location of the planter frame near to the rear axle structure is desirable, particularly when planting in curved rows, such as when the planting is done on terraced land. The seed from the planter frame will not be thrown out of alinement with the rear wheels as the tractor is turned from one side to the other. Also, it is particularly desirable to have the fertilizer distributed only slightly ahead of the deposit of the seed and near to a location beneath the rear axle, so that fertilizer, when the tractor is turned to the right or left, is not thrown too far out of alinement with the seed as the tractor is turned. It is also common to employ portions of the cultivating equipment already located on the tractor for building up a bed on which is planted the seed. This cultivating equipment is located on the forward portion of the tractor, and tools are added to it of a type adapted to throw up the dirt into a bed. At other times this cultivating equipment is used as a support for the fertilizing seed spouts to side-dress the growing crop at the time of cultivating the same. Usually the fertilizing equipment for the side-dressing operation has been supplied separately from the fertilizing and planting equipment used during the planting operation.

It is, therefore, the principal object of the present invention to provide means whereby the fertilizer hopper structure, used during the planting operation, may be adjusted on the tractor for use during the side-dressing operation in connection with the cultivating equipment.

According to the present invention, the fertilizer hopper structure is connected to the tractor, so that it may be used at a position rearwardly of the cultivating equipment for use with the planting frame normally located beneath the tractor axle or to a position forwardly and above the cultivating equipment for use in side-dressing during the cultivating operation. The fertilizing hopper structure is supported by a bracket located intermediate the forward and rearward portions of the tractor and to which there is connected a supporting frame which carries the hopper structure. This supporting frame is so connected and arranged in its connection with the bracket member that it may be adjusted or reversed to support the hopper structure at a location forwardly of its other location for alinement with the cultivating equipment for side-dressing the cultivated plants.

For a better understanding of the invention, reference may be had to the following detailed description taken in connection with the accompanying sheets of drawings, in which.

Figure 1:
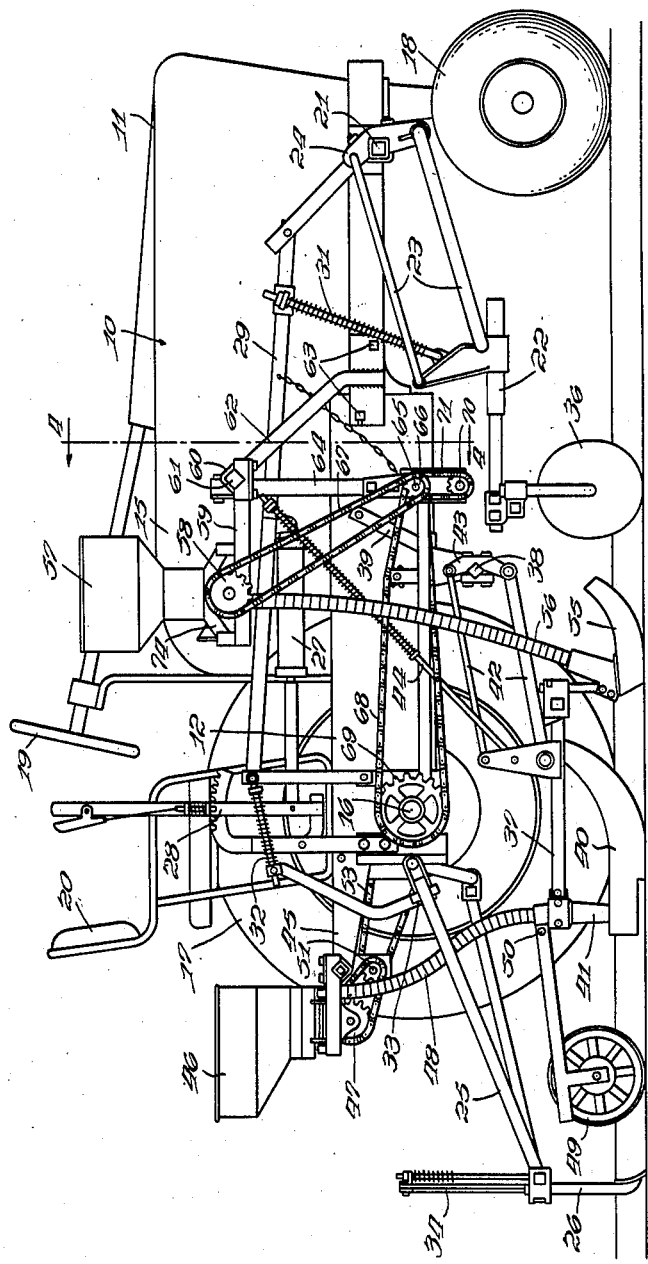
Figure 1 is a view in elevation of the tractor with one of its rear wheels removed and with the cultivating and planting equipment attached thereto.
Figure 2:
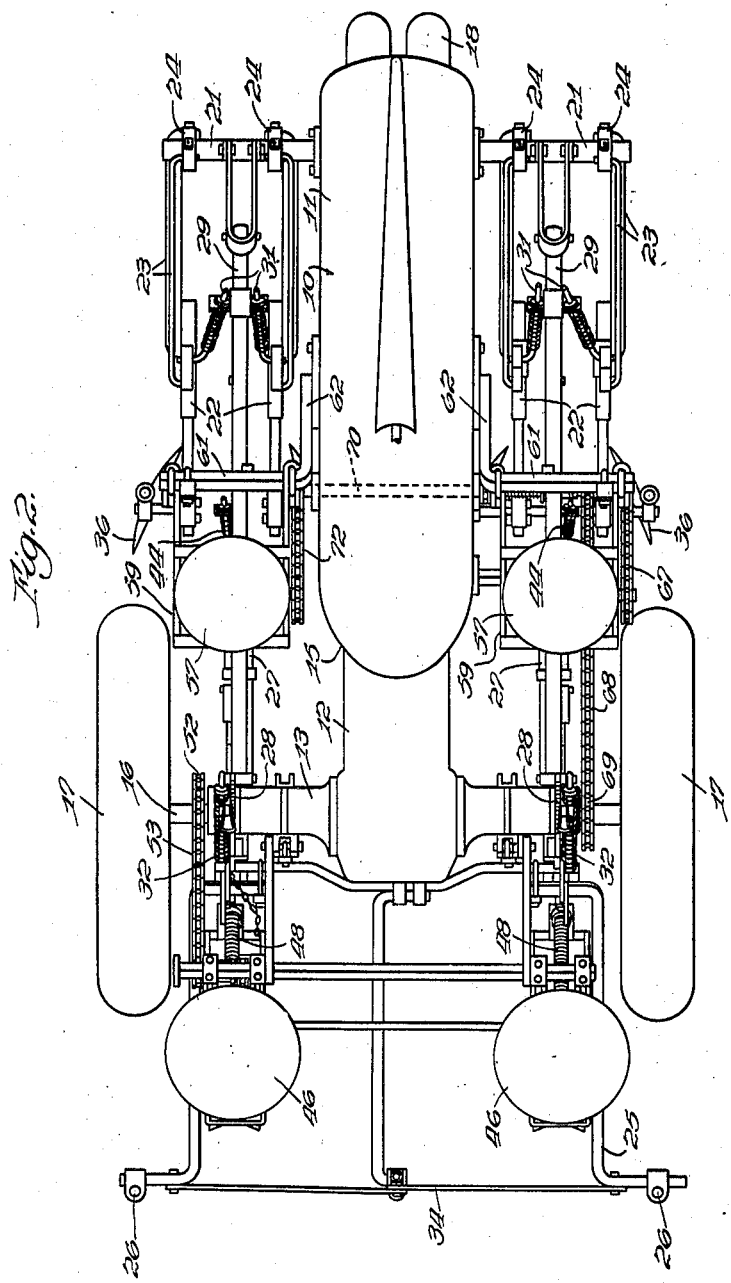
Figure 2 is a plan view of the tractor with its planting and cultivating equipment attached thereto.

Referring now to the drawings, there is shown a tractor 10 having a forward portion 11 and a rearward portion 12 with a rear axle structure 13 extending transversely out of a central body portion 15 of the tractor. Extending through the transverse axle structure 13 is a transverse axle 16 to which are connected the traction wheels 17 of the tractor. The forward portion of the tractor is supported on a dirigible wheel 18 adapted to be steered from a steering mechanism 19 accessible to an operator's station 20 on the rear portion 12 of the tractor. Connected to the forward portion of the tractor are transversely extending beams 21 forming a part of the cultivating equipment and to which the usual cultivating rigs 22 (see Figure 3) are attached by means of parallel links 23 and a bracket 24 clamped rigidly to the transverse member 21.

Connected to the rear portion of the tractor is the usual rear cultivating equipment 25 including working tools 26 alined with the respective dirigible and tractor wheels of the tractor to wipe out the wheel tracks made by the same. The cultivating equipment at each side of the tractor is usually independently operated by cylinder devices 27 located respectively at the opposite sides of the tractor and adapted to react against the adjustable stop mechanism 28. These adjustable stops 28, located respectively at opposite sides of the tractor, are accessible to the operator's station 20 and may be adjusted by the operator when he desires to vary the cultivating depth of the cultivating tools. The forward end of the cylinder device 27 is connected to the fore and aft movable means 29 which is connected with the forward and rear cultivating rigs 22 and 25, respectively, by means of the lifting rods 31 and 32, the lifting rod 32 at the rear of the tractor being connected to the vertically extending arm rigidly formed on the rear cultivating structure 25, as indicated at 33. The intermediate cultivating tool 26 is lifted by means of the arched structure 34 extending between the two outside rigs.

Figure 3:
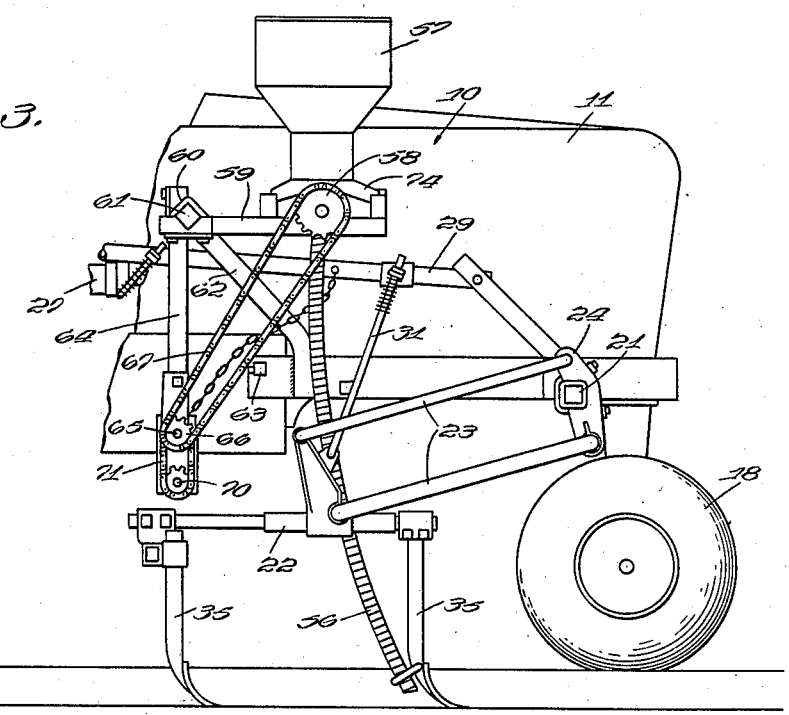
Figure 3 is a view of the forward portion of the tractor illustrating more clearly the feature of reversing the supporting frame for the fertilizing hopper structure for alinement with the cultivating equipment for effecting the side-dressing operation.
Figure 4:
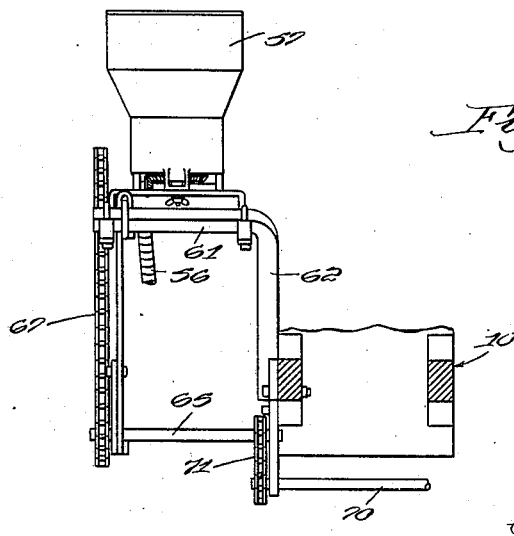
Figure 4 is a detail front view in elevation of the hopper bracket structure and taken along the line 4—4 of Figure 1.

When it is desired to convert the tractor with its cultivating equipment into an effective planting arrangement, the cultivating tools 35, shown in Figure 3, are removed and the bedding tools 36 are connected to the cultivating tool 22. These bedding tools are such as to throw up the dirt and thereby form a bed on which the fertilizer and seed are deposited.

A planter frame 37 is then connected to the tractor by a transverse tool bar 38 extending laterally underneath the tractor and connected thereto by means of the bracket members 39. The planter frame carries a seed furrow-opener 40 to the rearward end of which is located a seed spout 41, through which seeds are received for deposit in the furrow prepared by the furrow-opener 40. The planter frame 37 is connected to the transverse bar 38 by means of parallel links 42 and a bracket structure 43. This planter frame is also connected to the movable means 29 by means of a lift rod 44, so that the same will be lifted by the same cylinder device 27 that effects lifting of the cultivating equipment. On the rear portion 12 of the tractor is a bracket structure 45 for supporting a seed hopper structure 46 having means 47 adapted to be driven. As this seed hopper device is driven, seed is caused to pass through a tube 48 to the seed spout 41 carried by the planter frame 37. The seed will then be covered by the usual covering wheel 49 connected to the planter frame 37, as indicated at 50. There are two of these seed hopper structures 46 located on the bracket structure 45, and these are driven from a common shaft 51 extending transversely across the rear of the tractor and connected with a sprocket 52 on the rear axle 16 by means of a chain 53.

It should now be apparent that the planter frame 37 has been located sufficiently adjacent to the rear axle structure that turning movement of the tractor will not throw the seed spout out of lateral alinement with the planting bed. Also carried on the planter frame 37 is a fertilizing shoe 55 adapted to receive fertilizer through a tube 56 from a fertilizer hopper device 57 having means 58 adapted to be driven. As shown particularly well in Figure 1, the hopper structure 57 is supported on a frame 59 connected by clamping means 60 to a transversely extending squared portion 61 formed on a vertically extending bracket structure 62, which is attachable to the body portion 15 of the tractor by means of attaching bolts 63. With the supporting frame 59 located rearwardly of the transverse portion 61, the fertilizer hopper 57 will be in a position for proper alinement with the fertilizer shoe 55 carried on the planter frame 57.

Depending from the bracket structure 62 is a supporting member 64 on the lower end of which is connected a transversely extending shaft 65 having a pinion 66 for driving a chain 67 extending vertically and connected with means 58 adapted to be driven. This shaft 65 is in turn operated by a chain means 68 extending rearwardly for connection with a sprocket 69 on the rear axle 16. To drive the fertilizing hopper device on the left side of the tractor, there is provided a shaft 70 driven by chain means 71 from the shaft 65, which extends transversely beneath the tractor and connects with the fertilizer hopper device on the left side of the tractor by means of a chain 72. It should thus be apparent that the fertilizing and planter structures are similarly driven from the rear axle 16. Each of these driving mechanisms may have a clutch mechanism adapted to be operated when the planting frames are raised to a transport position to thereby interrupt the flow of fertilizer and seed.

When it is desired to use the fertilizing structure 57 for side-dressing the cultivated plants, the supporting-frame structure 59 is detached from the transverse portion 61 of the bracket 62 and connected again to the same in the reverse manner, as shown in Figure 3, so that the frame extends forwardly of the transverse portion 61. In this manner the supporting frame 59 is longitudinally adjusted along the tractor. It should thus be apparent that, with this adjustment made, the fertilizing hopper structure 57 may then be supported in proper alinement for use with the cultivating rig structure 22. A tube 56 is then connected directly to one of the cultivating tools 35, and fertilizer will then be distributed adjacent a cultivated plant. Since the distance to which the hopper structure 57 is moved forwardly is the same distance at which it is moved rearwardly of the transverse portion 61, the sprocket chain 67 need not have its length changed to effect satisfactory operation of the hopper structure in its forwardly located position.

It should now be apparent that there has been provided planting equipment of a type in which a portion of the same may be used for other operations than for planting. By having the fertilizing structure 57 adjustable, it can be located properly for use with the planter frame located beneath the rear axle structure of the tractor, and this same fertilizing structure can also be used by adjustment of the same longitudinally of the tractor with the cultivating rig structure 22 located on the forward portion of the tractor and considerably forwardly of the rear axle structure. The fertilizing hopper structure 57 is so designed that its attaching portions 74 will sit on the frame structure 59, regardless of the position of the same with respect to the transverse portion 61.

While various changes may be made in the detail construction of the present invention, it shall be understood that such changes shall be made without departing from the spirit and scope of the invention as defined by the appended claims.

What is claimed is:

1. In combination, a tool-supporting structure, a pair of independently operable ground-working tool frames mounted on the tool-supporting structure for vertical movement with respect thereto and located respectively at different locations thereon, a fertilizer hopper structure located on the tool-supporting structure and including drivable parts, support means for supporting said hopper structure on the tool-supporting structure, said support means being adjustable to selectively support the hopper structure in positions wherein it is respectively commodiously disposed with respect to the tools on said frames, hopper-structure driving means on said tool-supporting structure, and power transmitting means operably connected between said driving means and the drivable parts of said hopper structure, said power transmitting means being the same in any position of said hopper structure.

2. In combination, a tool-supporting structure, a pair of independently operable ground-working tool frames mounted on the tool-supporting structure for vertical movement with respect thereto and located respectively at different locations thereon, a fertilizing structure including a fertilizer hopper structure and reversible frame means for adjustably supporting the fertilizer hopper structure on the tool-supporting structure, whereby the fertilizer hopper structure may be alined with one or the other of the working tool frames.

3. In combination, a tool-supporting structure, planter and cultivator tool frames respectively connected to the tool-supporting structure for vertical movement with respect thereto and at different locations with respect to each other, a fertilizer hopper structure including drivable parts, support means for supporting the fertilizer hopper structure on the tool-supporting structure, hopper-structure driving means on the tool-supporting structure, and power transmitting means connected between said driving means and the drivable parts of said hopper structure, said support means being manipulatable to selectively support said hopper structure in positions respectively commodious to said tool frames and with respect to which positions said power transmitting means is universally operable for transmitting driving force from the driving means to the drivable parts of the hopper structure.

4. In combination, a tractor having a longitudinally extending body portion and a transversely extending rear axle structure, cultivating equipment carried by the forward part of the body portion, a planting frame connected to the body portion for vertical movement with respect thereto and arranged to extend to a location beneath the rear axle structure, a fertilizing structure including a fertilizing hopper structure, a fertilizing opener carried by the planting frame, and reversible frame means for adjustably supporting the fertilizer hopper structure on the body portion of the tractor whereby the fertilizer hopper structure may be alined with either the planting frame or the cultivating equipment.

5. For use with a vehicular machine having a frame from which earth-working tools are dependable into respective horizontally spaced operating positions, and a driving means from which driving force is transmittable; the combination of a hopper structure for holding material to be discharged upon the earth in proximity to said tools and including drivable means in control of such discharge, support means for supporting said hopper structure on the machine, said support means being manipulative to support the hopper structure in selective positions wherein it is disposed for discharge of the material in such proximity to respective of said tools, and power transmitting means operably connected between said driving means and the drivable parts of the hopper structure, said power transmitting means being the same irrespective of the aforesaid positions occupied by said hopper structure.

JOHN W. ORENDORFF.